United States Patent [19]
Kassai

[11] 4,453,287
[45] Jun. 12, 1984

[54] CASTER FOR BABY CARRIAGES

[75] Inventor: Kenzou Kassai, Osaka, Japan

[73] Assignee: Kassai Kabushikikaisha, Osaka, Japan

[21] Appl. No.: 324,679

[22] Filed: Nov. 25, 1981

[30] Foreign Application Priority Data

Dec. 17, 1980 [JP] Japan .............. 55-182019[U]

[51] Int. Cl.³ .......................................... B60B 33/00
[52] U.S. Cl. ................................. 16/35 R; 188/1.12; 188/74
[58] Field of Search ............... 16/35 R, 20, 35 D, 29; 188/1.12, 74

[56] References Cited

U.S. PATENT DOCUMENTS

| | | | |
|---|---|---|---|
| 2,707,794 | 5/1955 | Kramcsak, Jr. | 188/1.12 X |
| 2,900,659 | 8/1959 | Snell | 188/1.12 X |
| 2,972,163 | 2/1961 | Ross et al. | 188/1.12 X |
| 3,493,085 | 2/1970 | Libhart | 188/1.12 X |
| 4,035,864 | 7/1977 | Schroder | 188/1.12 X |

Primary Examiner—Donald R. Schran
Assistant Examiner—James Wolfe
Attorney, Agent, or Firm—W. G. Fasse; D. H. Kane, Jr.

[57] ABSTRACT

A caster-locking device for baby carriages (1) has a fixed shaft (7) secured to the lower end of a front leg (2) of the baby carriage, a notched cylindrical locking body (8) attached to the fixed shaft, a caster bracket (10) installed for rotation on the fixed shaft, a ground-engaging wheel (4) rotatably mounted on an axle (13) inserted in the caster bracket, a locking lever (14) rotatably attached to the caster bracket and having an operating knob (14d) adapted to be operated for rotation from the outside. Holders (15, 16, 17, 18, 19) hold the locking lever engaged with or disengaged from one or more notches (8a or 8b) in the locking body. The orientation of the locking lever and notches relative to each other and to the wheel is such that the locking can take place only when the wheel is in a predetermined position.

7 Claims, 4 Drawing Figures

CASTER FOR BABY CARRIAGES

BACKGROUND OF THE INVENTION

1. Field of the Invention

The present invention relates to a caster for baby carriages, and more particularly it relates to a caster-locking device for such a caster. The caster-locking device is adapted to stop the function of the caster as needed.

2. Description of the Prior Art

A baby carriage equipped with casters at the lower end of its legs can be moved very smoothly even if the pushing force on the baby carriage is minimal. Further, the direction of travel can be changed very easily even in narrow aisles as in department stores and supermarkets. Thus, the casters function to improve the steerability of the baby carriage.

However, this function of the casters, may sometimes do more harm than good as in cases where the baby carriage is being moved on a gravel road, since the presence of the casters causes the ground-engaging wheels to swivel more than necessary, making it rather hard to push the baby carriage.

SUMMARY OF THE INVENTION

The present invention has been accomplished with the above problem in mind. According to the present invention, there is provided a caster for baby carriages provided with a caster-locking device.

In brief, a caster for baby carriages, according to the invention, comprises a locking body fixed to the lower end of at least one of the front and rear legs of the baby carriages, the locking body being formed with at least one notch which is defined by a pair of opposing walls each extending in a vertical direction, a caster bracket installed to rotate about a vertical axis, a ground-engaging wheel installed on the caster bracket to rotate about a horizontal axis, a locking lever attached to the caster bracket to rotate only about a horizontal axis, the locking lever being formed with an engaging tongue for engagement with the notch of the locking body, and holder means for holding the locking lever engaged with and disengaged from the notch in the locking body.

According to the present invention, a caster-equipped baby carriage is constructed so that the caster brackets can be locked against rotation by the operation of the locking levers. Thus, the function of the casters can be utilized or stopped, as needed. The switching operation is very easy.

In a preferred embodiment of the invention, the holder means comprise a first pin extending in a horizontal direction and attached to the caster bracket, a second pin extending in a horizontal direction and attached to the locking lever so that the locking lever may be rotatably supported with respect to the caster bracket, and a tension spring installed between the first pin and the locking lever, the locking lever having a first engaging hole for receiving the first pin, the first engaging hole having first and second engaging portions for selectively positioning the first pin into first and second locations in the first engaging hole, the caster bracket having a second engaging hole for receiving the second pin, and the second engaging hole having an elongated configuration so as to allow the second pin to move along the second engaging hole, whereby the locking lever, when the first pin is located in the first engaging portion of the first engaging hole, causes the engaging tongue to be disengaged from the notch, and the locking lever, when the first pin is located in the second engaging portion of the first engaging hole, causes the engaging tongue to be engaged with the notch, the respective states of the locking lever being stabilized by the tension spring, and the change between the states of the locking lever being achieved by making the locking lever rotate while the second pin is moved into the second engaging hole against the resilience of the tension spring.

Accordingly, an object of the invention is to provide a caster for baby carriages provided with a locking device which is adapted to stop the function of the caster, as needed.

This object and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

FIGS. 1 to 4 show a caster for baby carriages according to an embodiment of the present invention.

Figure 1:
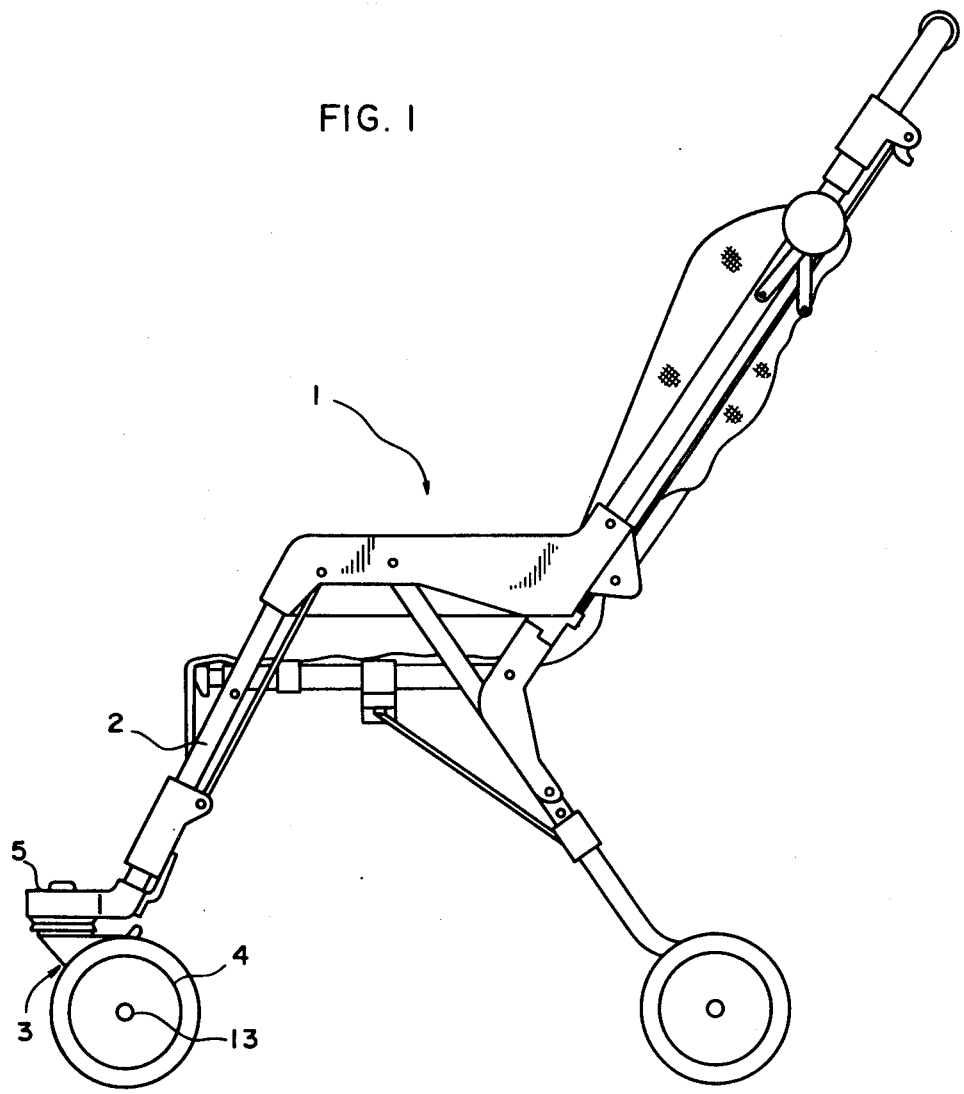
FIG. 1 is a side view showing a baby carriage comprising a caster according to an embodiment of the present invention.
Figure 2:
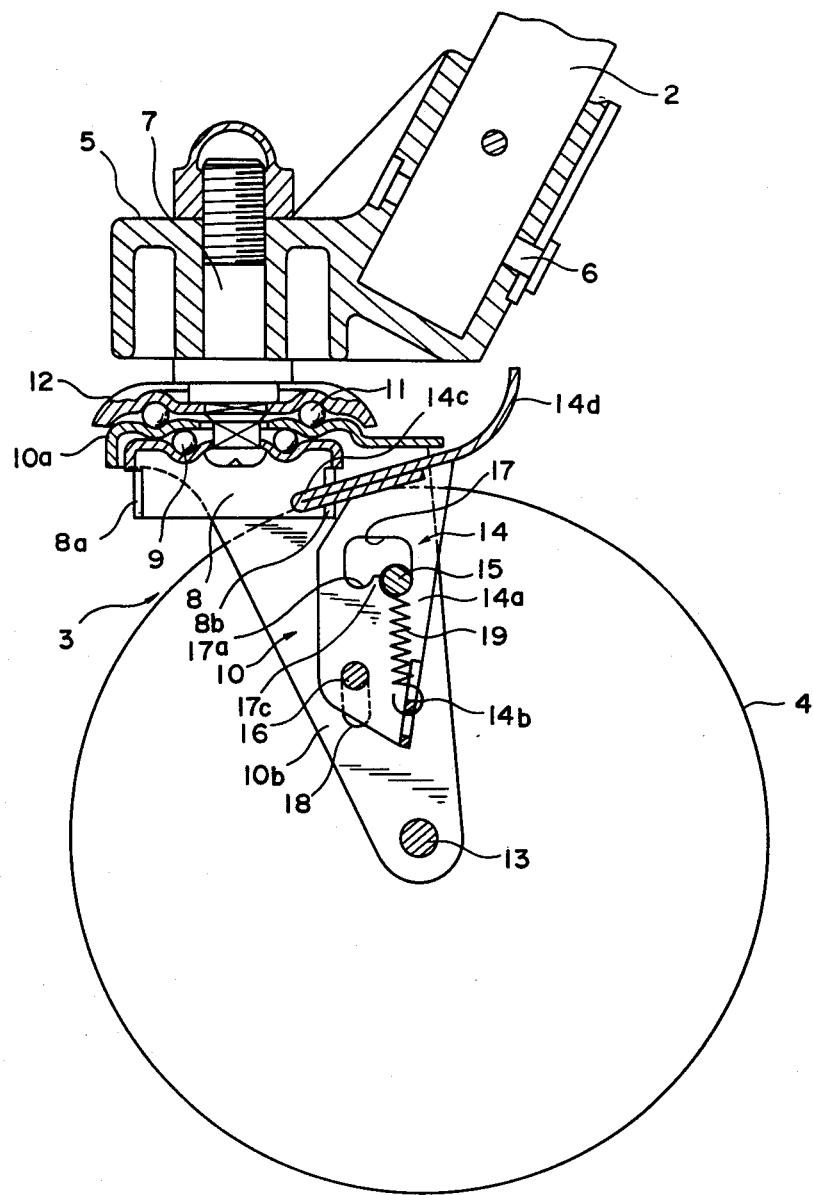
FIG. 2 is a sectional view showing the arrangement associated with a locking lever and a locking body of FIG. 1, shown in the engaged state.
Figure 3:
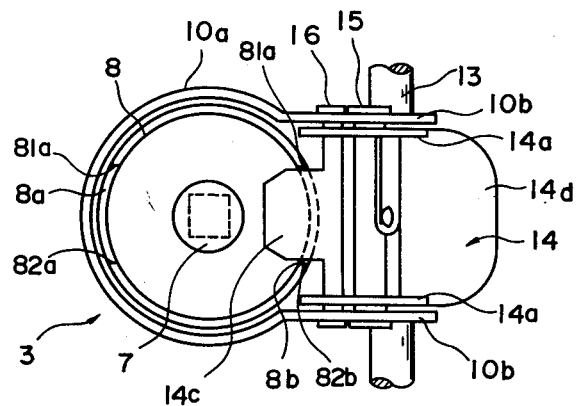
FIG. 3 is a bottom view of an outline of the arrangement in FIG. 2.

FIG. 1 shows an example of a baby carriage 1 in which an embodiment of the invention is advantageously utilized. The main body of this baby carriage 1 is disclosed in U.S. patent application Ser. No. 141,265 and British Patent Application No. 8,012,810 which correspond to each other. The baby carriage 1 has front wheels 4 attached to the lower ends of its front legs 2 by means of casters 3. In such casters 3, a caster attaching member 5 is fixed to the lower end of the associated front leg 2 by a pin 6, as shown in FIG. 2. The caster attaching member 5 has a fixed shaft 7 connected to it. The fixed shaft 7 extends in a vertical direction. A cylindrical locking body 8 is secured to the lower end of the fixed shaft 7 and is formed with notches 8a and 8b in its front and rear surfaces. The notches 8a and 8b are defined by a pair of opposing walls 81a and 82a and another pair of opposing walls 81b and 82b, respectively, as shown in FIG. 3. The walls 81a, 82a, and 82b extend in the vertical direction. The circular portion 10a of the caster bracket 10 is rotatably mounted on the fixed shaft 7 above the locking body 8 with a bearing 9 interposed therebetween, and a cover 12 is attached to the fixed shaft 7 above the circular portion 10a of the caster bracket 10 with a bearing 11 interposed therebetween. The caster bracket 10 comprises the circular portion 10a and bracket portions 10b integral with the latter and extending downwardly therefrom. The bracket portions 10b have an axle 13 horizontally extending through the lower ends thereof. The front wheels 4 are rotatably mounted on the axle 13 at the opposite ends. A substantially U-shaped locking lever 14 is interposed between the bracket portions 10b and has two horizontally extending pins 15 and 16 inserted therein. The first pin 15 extends through round holes of the same diameter as the first pin 15 formed in the bracket portions 10b and also through approximately rectangular engaging holes 17 having two engaging portions 17a and 17b formed in the opposed lateral plates 14a of the locking lever 14. The second pin 16 extends through elongated holes 18 in the bracket portions 10b and round holes of the same diameter as the second pin 16 formed in the opposed lateral plates 14a of the locking lever 14. A tension spring 19 is installed between the above described first pin 15 and a projection 14b on the locking lever 14. Further, the upper end of the locking lever 14 is formed with an engaging tongue 14c for engagement with the notch 8a or 8b of the locking body 8 describe above. An operating knob 14d extends in the direction opposite to the engaging tongue 14c for operating the locking lever 14 from the outside.

The manner of operation of the caster or the caster-locking device will now be described.

Figure 4:
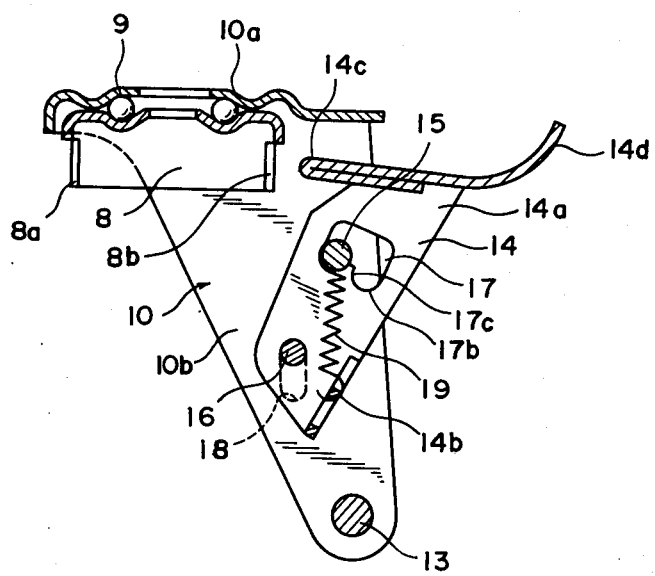
FIG. 4 is a sectional view showing the arrangement in FIG. 2, but shown in its disengaged state.

When it is desired to use the caster mechanism as when the baby carriage 1 is moved on pavement or in an aisle of a department store or supermarket, for example, the locking lever 14 is tilted rearwardly as shown in FIG. 4 so as to render the caster bracket 10 free to rotate relative to the fixed shaft 7.

On the other hand, when it is desired to stop the function of the caster as in the case of moving the baby carriage 1 on a gravel road, for example, the operating knob 14d of the locking lever 14 is turned by hand upwardly from the state of FIG. 4 or is kicked upwardly, whereby the second pin 16 is moved slightly downwardly along the elongated holes 18 of the bracket portions 10b with the result that the first pin 15 is moved across projections 17c in the rectangular holes 17 of the locking lever 14 and then the locking lever 14 is pulled up by the force of the tension spring 19 until the first pin 15 engages the second engaging portions 17b of the rectangular holes 17, establishing the state of FIG. 2. In this state, the locking tongue 14c of the locking lever 14 has entered the notch 8b in the locking body 8, with the result that the caster bracket 10 is rendered unrotatable, thus stopping the function of the casters. In addition, as shown in FIG. 3, the locking tongue 14c is tapered so that the locking tongue 14c may easily enter the notch 8b.

The state of FIG. 2 can be changed into the state of FIG. 4 by turning the operating knob 14d downwardly by hand or foot in the reverse manner.

According to the caster-locking device in this embodiment having the construction described above, when the baby carriage 1 is to be moved on pavement or in a narrow aisle in a department store or supermarket, for example, the casters can be used to provide smooth steering of the baby carriage 1, and when it is not desirable to have such casters as in the case of moving the baby carriage 1 on a gravel road, the function of the casters can be stopped. Moreover, the necessary switching operation can be effected with great ease by simply kicking the operating knob 14d of the locking lever 14 upwardly or downwardly.

The foregoing embodiment has been described with reference to a case where casters are installed on the front wheels, but they may be installed on the rear wheels or on both the front and rear wheels. Further, the foregoing description refers to a case where the locking tongue 14d of the locking lever 14 engages the rear notch 8b of the locking body 8, but it may, of course, engage the front notch 8a of the locking body. In addition, either one of these notches 8a and 8b alone may be provided. As best seen in FIG. 2, the locking lever 14 or rather its locking tongue 14c and the notches 8a, 8b are oriented relative to each other and to said wheels so that a locking can take place only when the wheels are in a predetermined orientation relative to the movement direction of the carriage.

The foregoing description refers to the case of a double-bearing construction having upper and lower ball bearings 9 and 10 disposed above and below the caster bracket 10a, but a single-bearing construction may, of course, be used.

In the above embodiment, as a means for holding the locking lever 14 engaged with and disengaged from the notch 8a or 8b of the locking body 8, use has been made of the first pin 15 for engagement with the rectangular holes 17 of the locking lever 14 and the second pin 16 for engagement with the elongated holes 18 of the caster bracket 10, and the spring 19. However, other holder means may be used. Although the present invention has described and illustrated in detail, it is clearly understood that the same is by way of illustration and example only and is not to be taken by way of limitation, the spirit and scope of the present invention being limited only by the terms of the appended claims.

What is claimed is:

1. A caster for baby carriages having front leg means and rear leg means defining a given movement direction of the carriage, said caster comprising: a locking body fixed to the lower end of at least one of said front and rear leg means, said locking body having at least one notch which is defined by a pair of opposing walls each extending in a vertical direction; a caster bracket installed for rotation about a vertical axis; a ground-engaging wheel installed on said caster bracket for rotation about a horizontal axis; a locking lever attached to said caster bracket for rotation only about a horizontal axis, said locking lever having an engaging tongue for engagement with said notch of said locking body; and holder means for holding said locking lever engaged with and disengaged from said notch of said locking body, said at least one notch and said notch engaging tongue being so oriented relative to each other and relative to said ground-engaging wheel that the tongue can engage the notch when said wheel is aligned with said movement direction for preventing a wheel locking when the wheel is not aligned with said movement direction and wherein said holder means comprise a first pin horizontally extending and attached to said caster bracket; a second pin horizontally extending and attached to said locking lever so that the locking lever is rotatably supported with respect to said caster bracket; and a tension spring installed between said first pin and said locking lever; said locking lever having a first engaging hole for receiving said first pin; said first engaging hole having first and second engaging portions for selectively positioning said first pin into first and second locations in said first engaging hole; said caster bracket having a second engaging hole for receiving said second pin; and said second engaging hole having an elongated configuration so as to allow said second pin to move along said second engaging hole; whereby said locking lever, when said first pin is located at said first engaging portion of the first engaging hole, renders said engaging tongue to be disengaged from said notch, and said locking lever, when said first pin is located at said second engaging portion of the first engaging hole, causes said engaging tongue to be engaged with said notch, said respective states of said locking lever being stabilized by the tension of said tension spring, and wherein the change between said states of said locking lever is achieved by rotating said locking lever while said second pin is moved in said second engaging hole against the resilience of said tension spring.

2. The caster in accordance with claim 1, further comprising a fixed shaft secured to the lower end of said at least one of said leg means, said fixed shaft extending in a vertical direction.

3. The caster in accordance with claim 2, wherein said locking body is attached to said fixed shaft, and said caster bracket is installed for rotation on said fixed shaft.

4. The caster in accordance with claim 1, further comprising an axle supported by said caster bracket, said axle extending in a horizontal direction.

5. The caster in accordance with claim 4, wherein said wheel is rotatably mounted on said axle.

6. The caster in accordance with claim 1, wherein said locking lever comprises an operating knob adapted to be operated for rotation from the outside.

7. The caster in accordance with claim 1, wherein said engaging tongue of said locking lever is tapered off so as to enter said notch easily.

* * * * *